Patented Sept. 4, 1945

2,384,120

UNITED STATES PATENT OFFICE 2,384,120

UNSATURATED ESTERS AND POLYMERS THEREOF

Irving E. Muskat, Akron, and Franklin Strain, Norton Center, Ohio, assignors to Pittsburgh Plate Glass Company, Pittsburgh, Pa., a corporation of Pennsylvania No Drawing. Application December 27, 1941,
Serial No. 424,664

8 Claims. (Cl. 260—78)

This invention relates to a new class of unsaturated esters and valuable polymers thereof. The new compounds are esters of (a) an ester of an alpha hydroxy carboxylic acid and (b) an acid ester of carbonic acid in which at least the acid ester or the hydroxy acid ester, and preferably both, are unsaturated.

The new esters are esters of unsaturated alcohols, preferably those which contain up to five carbon atoms and which contain an unsaturated group in an aliphatic chain such as allyl, methallyl, crotyl, isocrotyl, propargyl, isopropenyl, methyl-propargyl, ethyl-allyl, and butadienyl alcohols, methyl vinyl carbinol, ethyl vinyl carbinol, methallyl carbinol, methyl allyl carbinol, and the corresponding halogen substituted alcohols such as 2-chloroallyl, chlorocrotyl, and 2-bromoallyl alcohols. The ester of the hydroxy acid may also be a vinyl ester. Esters of alcohols containing six to ten carbon atoms, for example, the esters of cinnamyl, phenylpropargyl, and propylallyl alcohols, diallyl carbinol, linalool, geraniol, 1-hydroxy-2,4-hexadiene, ethyl isobutenyl carbinol and the halogen substituted products of the same, such as chlorocinnamyl alcohol and ethyl chlorallyl carbinol and the esters of unsaturated ether alcohols are also useful, for example, allyl Cellosolve, and methallyl Cellosolve also may be prepared.

The new compounds are unsaturated esters of an alpha hydroxy aliphatic monocarboxylic acid such as lactic, glycolic, leucinic, α-hydroxy butyric, valerolactinic, acetonic, or the corresponding halogen substituted acids. The compounds have a structural formula which may be represented thus:

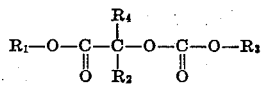

in which R₁ may be any unsaturated alcohol radical, R₃ may be any unsaturated alcohol radical containing three or more carbon atoms, and in which R₂ and R₄ are either hydrogen, or hydrocarbon radicals.

The new esters may be prepared by reacting chloroformates of unsaturated alcohols, made by reaction of phosgene upon the unsaturated alcohol while maintaining the temperature below 20° C. and preferably close to 0° C. with unsaturated esters of alpha hydroxy acids. Thus, allyl chloroformate, methallyl chloroformate or other unsaturated chloroformate may be reacted with unsaturated esters such as allyl glycolate, allyl lactate, allyl leucinate, allyl hydroxy butyrate, allyl acetonate, etc., or the corresponding methallyl, chlorallyl, crotyl, etc., ester. The reaction is preferably conducted at a temperature between 0° C. and 20° C. and in the presence of a basic reagent such as pyridine or other cyclic tertiary amine, or an oxide, hydroxide, or carbonate of an alkaline or alkaline earth metal. The same esters may be prepared by reacting the unsaturated alcohol esters of the alpha hydroxy acids with phosgene to form the corresponding chloroformates of the following structure:

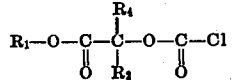

This reaction is usually performed at temperatures between 0° C. and 20° C. The chloroformates of unsaturated esters of alpha hydroxy acids such as chloroformate of allyl lactate, chloroformate of allyl leucinate, chloroformate of allyl glycolate, chloroformate of other alpha hydroxy acid or the corresponding methallyl, crotyl, ethylallyl, cinnamyl, etc., alcohols, are treated with unsaturated alcohol. The latter reaction is conducted in the presence of an alkaline reagent and at subnormal temperatures. Mixed polyunsaturated esters may be prepared, for example, by reaction of allyl lactate with methallyl chloroformate under similar conditions.

The reactions are preferably conducted at temperatures between 0 and 20° C. to prevent undesirable side reactions. Since the reaction is exothermic it is usually necessary to combine the reactants slowly and to provide an efficient cooling medium. Under certain conditions, for example, when an insoluble alkaline agent such as calcium carbonate is used, it may be desirable to heat the reaction mass slightly to effect a reaction. The reaction may be conducted in the presence of a solvent or diluent such as benzene, toluene, xylene, acetone, chloroform, or other inert liquid.

The new unsaturated esters are true chemical compounds having definite boiling and melting points. Accordingly, some of them may be purified by distillation at reduced pressures. More-over, these unsaturated esters may be purified by vaporizing the volatile impurities and washing with water or aqueous solutions such as aqueous solutions of sodium carbonate, sodium chloride, etc., to remove water soluble impurities. Where the esters are solids they may be purified by crystallization.

The monomeric esters are valuable as plasticizers for various resin materials such as styrene, cellulose, vinyl, urea, protein, phenolic, or acrylic resins. Other uses such as solvents, insecticides, and liquid coating compositions are noteworthy. These esters may be polymerized in the presence of heat or light or other catalyst to yield solid or liquid compositions of widely different physical properties. The polymerization is preferably conducted in the presence of catalysts such as oxygen, ozone, or organic peroxides such as lauryl, benzoyl, and acetone peroxides.

The products of polymerization vary greatly in their physical properties, depending upon the molecular structure of the monomer as well as upon the extent of polymerization. The polymers are generally transparent and colorless. The ultimate polymers of polyunsaturated compounds having two or more unsaturated groups are substantially insoluble and infusible at atmospheric pressure.

Intermediate polymers of the polyunsaturated esters which have a wide range of properties may be secured. Upon the initial polymerization of the liquid monomers or solutions of the monomers in suitable solvents, an increase in the viscosity of the liquids is noticeable due to the formation of a polymer which is soluble in the monomer and in solvents such as acetone, benzene, xylene, dioxane, toluene, or carbon tetrachloride. Upon further polymerization, the liquid sets up to form a soft gel containing a substantial portion of polymer which is insoluble in the monomer and organic solvents, and containing as well, a substantial portion of soluble material which may be monomer and/or soluble fusible polymer. These gels are soft and bend readily. However, they are fragile and crumble or tear under low stresses. They may be further polymerized in the presence of catalysts to the final infusible insoluble state.

The monomeric polyunsaturated esters may be cast polymerized directly to the insoluble infusible state. This procedure is subject to certain inherent difficulties due to the reduction in volume during the polymerization. Often during polymerization strains are established in the hardening gel which frequently result in fractures as the final hard form is attained. It has been discovered that these difficulties may be avoided by releasing the strains established in the gel. This may be done by interrupting the polymerization at an intermediate stage and permitting the strains to be relieved or by conducting polymerization under conditions which permit gradual release of these strains. For example, the polymerization may be conducted in a simple mold until a soft firm gel has formed. At this point the polymerization may be interrupted and the shaped polymer freed from the mold to which it adheres strongly. When released the polymer contracts substantially thereby relieving the polymerization strains. The gel may thereafter be shaped, if desired, and polymerized to the final infusible state. Smooth, optically perfect sheets may be made by this method. Preferably, the initial polymerization is conducted at a temperature sufficiently low to prevent the decomposition of the peroxide catalyst. This temperature is dependent upon the catalyst used. For benzoyl peroxide temperatures of 65 to 80° C. are suitable, while for acetone peroxide, temperatures of 140 to 150° C. may be used. This soft sheet of gel is then freed of the mold and in accordance with one modification, the gel may be coated on both sides with monomer or the syrupy polymer. The coated article is then polymerized between smooth heated plates to the final insoluble state.

In order to inhibit formation of cracks during the initial polymerization, it is frequently desirable to minimize the polymerization on one side of the sheet. This is done by conducting the polymerization with one side exposed to the air or other polymerization inhibitors such as benzoyl peroxide. By this means a sheet is produced which is hard and smooth on one side while being soft and tacky on the other. The sheet may then be finished by coating the tacky side with monomer or syrupy polymer and polymerizing it in contact with a smooth plate to the infusible, insoluble state. Often it is found desirable to release the polymer from the plate one or more times during polymerization of the coating in order to minimize formation of cracks or other surface defects.

Other methods have been developed for polymerization of the polyunsaturated compounds herein contemplated while avoiding formation of cracks and fractures. By one of these methods the polymerization may be suspended while the monomer-polymer mixture is in the liquid state and before the polymer is converted to a gel by cooling, by removal from exposure to ultra-violet light, by adding inhibiting materials such as pyrogallol, hydroquinone, aniline, phenylene diamine, or sulphur, or by destruction of the polymerization catalyst. The fusible polymer may be separated from all or part of the monomer by any of several methods. It may be precipitated by the addition of nonsolvents for the fusible polymer such as water, ethyl alcohol, methyl alcohol, or glycol. Alternatively, it may also be separated from the monomer by distillation in the presence of an inhibitor for polymerization and preferably at reduced pressures. The fusible polymer is thus obtained in stable solid form and as such may be used as a molding powder or may be redissolved in suitable solvent for use in liquid form. It is soluble in organic solvents which are normally capable of dissolving methyl methacrylate polymer or similar vinyl type polymer. Preferably, the polymers are produced by heating the monomer or a solution thereof in the presence of 2 to 5 percent of benzoyl peroxide until the viscosity of the solution has increased about 100 to 500 per cent. This may require several hours while heating at 65–85° C. in the presence of benzoyl peroxide. The resulting viscous solution is poured into an equal volume of water, methyl or ethyl alcohol, glycol or other nonsolvent for the fusible polymer. A polymer usually in the form of a powder or a gummy precipitate is thus formed which may be filtered and dried. This permits substantially complete separation of a soluble fusible polymer from unpolymerized monomer.

Often, however, such complete separation may not be desirable since hazy products may be secured upon further polymerization. Accordingly, it is often desirable to produce compositions comprising the fusible polymer and the monomer. This may be effected by partial distillation or extraction of monomer from the polymer or by reblending a portion of the fusible polymer with the same or a different polymerizable monomer. In such a case, the composition should contain at least 40 percent and preferably in excess of 50 percent fusible polymer and from about 5 percent to 50 or 60 percent monomer.

Preferably, the production of these materials is conducted by treatment of a solution of the monomer in a solvent for monomer and polymer such as benzene, xylene, toluene, carbon tetrachloride, acetone, or other solvent which normally dissolves vinyl polymers.

Other polymerization methods may involve the interruption of the polymerization while the polymer is a gel. For example, a soft solid gel containing a substantial proportion of fusible polymer may be digested with a quantity of solvent for the fusible polymer to extract the fusible gel from the infusible. The solution may then be treated as above described to separate the fusible polymer from the solvent. These polymers may be used as molding or coating compositions. Due to their solubility they are particularly desirable for use in paint compositions.

Other fusible polymers may be prepared by carrying the initial polymerization to the point where the polymer is in the form of a gel which generally contains at least 20 percent and preferably about 45 to 80 percent by weight of substantially insoluble polymer, but at which point the gel is still fusible. This solid resin composition may be disintegrated to a pulverulent form and used as a molding powder. Alternatively, a desirable polymer may be prepared by emulsifying the monomer or a syrupy polymer in an aqueous medium with or without a suitable emulsification agent such as polyvinyl alcohol, polyallyl alcohol, polymethallyl alcohol, etc., and then polymerizing to the point where the gel precipitates. This polymer may be separated and used as molding powder.

The solid forms of the fusible polymers may be used as molding compositions to form desirable molded products, which may be polymerized to a thermohardened state. Preferably, the molding is conducted in a manner such that the polymer fuses or blends together to form a substantially homogeneous product before the composition is polymerized to a substantially infusible state. This may be effected by conducting polymerization at an elevated temperature and/or pressure in the presence of 1 to 5 percent of benzoyl peroxide generally in a heated mold. The polymers may be mixed with fillers such as alpha cellulose, wood pulp and other fibrous substances, mineral fillers or pigments such as zinc oxide, calcium carbonate, lead chromate, magnesium carbonate, calcium silicate, etc., plasticizers, such as the saturated alcohol esters of phthalic acid, camphor, the saturated alcohol esters of maleic, fumaric, succinic, and adipic acids or di- or triethylene glycol bis (butyl carbonate). The polymeric molding powder may be copolymerized with phenolic, cellulose acetate, urea, vinylic, protein, or acrylic resins. It is thus possible to produce transparent or opaque forms of a wide variety of colors and hardnesses, depending upon the proper selection of the modifying agents.

The fusible polymers may be dissolved in suitable solvents and used as coating and impregnating compositions. For example, the solution or dispersion of fusible polymer in monomer or other organic solvent such as benzene, toluene, chloroform, acetone, dioxane, carbon tertachloride, phenyl Cellosolve, dichlorethyl ether, dibutyl phthalate, or mixtures thereof is useful as a liquid coating composition. Objects of paper, metal, wood, cloth, leather, or synthetic resins may be coated with the solution of polymer in solvent and subsequently polymerized to yield attractively finished coatings. Similarly, porous objects of felt, cloth, paper, leather, etc., either in single layers or laminated may be impregnated with the dissolved fusible polymer and subjected to polymerization to the final insoluble, infusible state.

The following examples are illustrative:

*Example I*

364 parts by weight of allyl chloroformate was added over a period of two and one-half hours, to 357 parts by weight of allyl lactate dispersed in 268 cc. of pyridine with stirring, at a temperature maintained between 2 and 18° C. The reaction mixture was acidified to the methyl orange end point, washed with water, dilute HCl, dilute Na$_2$CO$_3$ solution, and finally again with water. The new compound was dried over anhydrous sodium carbonate and purified by distillation. The product, an ester of allyl acid carbonate and allyl lactate, was a colorless liquid of low viscosity which boiled at 112° C. at 2 mm. of pressure, and had an index of refraction ($n_D^{20}$) of 1.438 and a density ($d_4^{20}$) of 1.064. The formula of this compound probably is as follows:

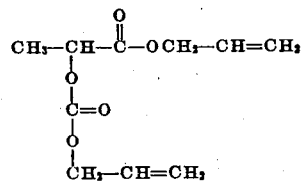

A quantity of the ester of allyl acid carbonate and allyl lactate was heated over an oil bath at a temperature of 150° C. while bubbling a stream of air through the monomer. After about 3 hours the viscosity of the polymerizing ester had increased noticeably. The fusible polymer was then precipitated by adding methanol and recovered. The fusible polymer was mixed with 1 percent benzoyl peroxide and molded in a press under a pressure of 2000 pounds per square inch pressure for 30 minutes at a temperature of 145° C. The resulting product was a colorless solid resin.

*Example II*

453 gms. of methallyl lactate was mixed with 298 gms. of pyridine in a reaction vessel equipped with a stirring device. 464 gms. of methallyl chloroformate was slowly added thereto, while the reaction mixture was maintained between 10 and 20° C. The product was washed with water and heated at 95–100° C. in the presence of activated charcoal and at a total pressure of 15–20 mm. whereby most of the impurities were recovered. After the carbon was removed by filtration the methallyl acid carbonate ester of methallyl lactate was dried over anhydrous sodium sulphate. This ester is a clear, colorless liquid having a density ($d_4^{20}$) of 1.058 and an index of refraction ($n_D^{20}$) of 1.445. This compound has the following probable structure:

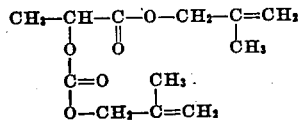

The compound polymerized by heating in the presence of 5 percent benzoyl peroxide at a temperature of 70 to 80° C. to form a hard, transparent, and colorless resin.

Example III

A mixture of 100 gms. of pyridine and 116 gms. of allyl glycolate was prepared and 135 gms. of methallyl chloroformate was added slowly while the temperature was maintained between +5 and +18° C. The resulting ester was believed to have the molecular constitution:

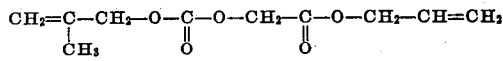

It was freed of impurities by washing with water and dilute HCl and separating from the benzene by distillation at reduced pressures. A 5 gram sample was polymerized readily by heating to 75° C. for one hour in the presence of 5 percent benzoyl peroxide.

Example IV 150 grams of allyl leucinate made by the direct esterification of leucinic acid with allyl alcohol was mixed with 500 cc. of benzene. The solution was cooled to about 0° C. in a mixture of ice and salt. Phosgene was bubbled into the cold solution at a rate of about 20–30 millimoles per minute while the reaction mass was stirred. The temperature of the reaction vessel remained between +2 and +12° C. throughout the reaction. The reaction was substantially complete in about 2 hours. A mixture of 50 gms. of allyl alcohol and 80 gms. of pyridine was prepared and the chloroformate solution slowly added while cooling to keep the reaction mass at a temperature below +10° C. at all times. The resulting benzene solution was washed with dilute HCl and with water and finally dried over anhydrous sodium sulphate. The ester was separated from the benzene solvent by heating at a total pressure between 2 mm. and 10 mm. until the benzene was evaporated. The ester was believed to have the structure:

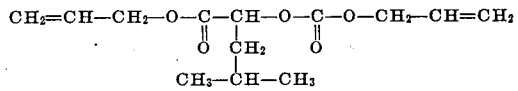

Ten grams of the ester was dissolved in 100 cc. of benzene and mixed with 3 percent benzoyl peroxide.

Example V

A quantity of the ester prepared as in Example IV was dissolved in benzene to form a 15 percent solution thereof. This solution was mixed with 5 percent benzoyl peroxide (based on the ester) and heated at 50° C. for 2 hours. A pronounced increase in viscosity was noted. The viscous solution was then poured into an equal volume of methyl alcohol. A fine pulverulent polymer was precipitated and separated by filtration. After washing and drying a light yellow granular solid was obtained. A 5 gram sample was mixed with 3 percent benzoyl peroxide and pressed in a mold at 2000 pounds per square inch at 135° C. A brittle transparent and nearly colorless resin was formed.

Example VI

A quantity of 60 gms. of methallyl alcohol, 95 gms. of alpha hydroxy butyric acid and one gram of pyrogallol were heated at 85–95° C. for four hours. The evolution of water vapor had apparently ceased and the reaction was then cooled and washed with 50 cc. of cold water. The dried ester was mixed with 500 cc. of benzene and 100 gms. of pyridine. Allyl chloroformate was then dropped in slowly at a rate which permitted the reaction temperature to remain below +10° C. The mixture was permitted to stand for 15 hours after the addition was completed. The ester prepared was a high boiling, substantially colorless liquid which is believed to have the following structure:

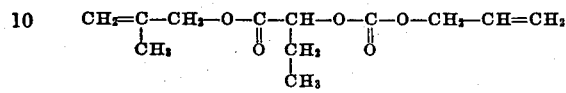

The ester was separated from its impurities by heating at 2–10 mm. until all of the benzene was evolved and was then washed with water and dried over anhydrous sodium sulphate.

The ester polymerized upon heating with 2 percent benzoyl peroxide at 85° C. for one and one-half hours.

Example VII 60 gms. of allyl alcohol, 1½ grams of hydroquinone (to inhibit polymerization) and 100 gms. of valerolactinic acid were heated at 80–90° C. for 6 hours. After the esterification had taken place to a substantial extent the excess allyl alcohol was distilled off by heating to 95° C. for one-half hour. One-half liter of benzene was added and the mixture was cooled to 0° C. on an ice bath. Phosgene was passed in at a rate of about 20 millimeters per minute for 10 minutes and then at a rate of 25–30 millimeters per minute for ½ hour. The temperature was maintained between 5° C. and 12° C. throughout the entire reaction. The benzene solution of the chloroformate of allyl valerolactinate was washed with dilute hydrochloric acid and with water. The solution was then mixed with 40 gms. of allyl alcohol and 80 gms. of pyridine were added slowly at such a rate that the temperature was maintained below 15° C. at all times.

The crude benzene solution was washed with dilute hydrochloric acid, Na$_2$CO$_3$ solution and finally with water. The benzene was removed by evaporation. The ester was mixed with 2 percent acetone peroxide and heated at 150° C. for one hour. A hard polymerized material was formed.

Example VIII

By the procedure described in Example VI, allyl alcohol and alpha-hydroxy-butyric acid were esterified and subsequently reacted with allyl chloroformate to produce the ester:

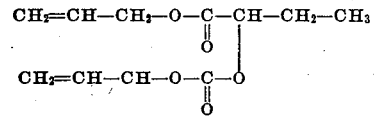

Example IX

By the procedure described in Example VII, valerolactinic acid and methallyl alcohol were reacted to produce an hydroxy ester which was then treated with the chloroformate of methallyl alcohol. The resulting complex ester was believed to have the structure:

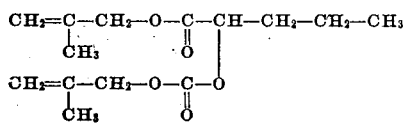

Example X

By using chlorallyl alcohol in place of allyl alcohol in Example IV, an ester having the following structure was produced:

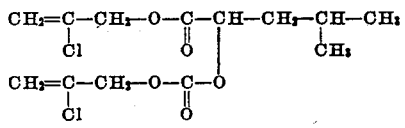

Although the present invention is described with reference to certain specified examples, it is not intended that the details therein described shall be limitations upon the scope of the invention except as included in the following claims.

This case is a continuation-in-part of Serial No. 361,280, filed October 15, 1940, and of Serial No. 392,103, filed May 6, 1941, by Irving E. Muskat and Franklin Strain.

We claim:

1. An ester of allyl alpha hydroxy butyrate and allyl acid carbonate.
2. An ester of methallyl valerolacinate and methallyl acid carbonate.
3. An ester of chlorallyl leucinate and chlorallyl acid carbonate.
4. A polymer of an ester of allyl alpha hydroxy butyrate and allyl acid carbonate.
5. A polymer of an ester of chlorallyl leucinate and chlorallyl acid carbonate.
6. A neutral ester of (A) a monohydroxy ester of (a) a monohydroxy aliphatic monocarboxylic acid having the hydroxy group in the alpha position and (b) a monohydroxy alcohol having up to ten carbon atoms and an unsaturated linkage in an aliphatic straight chain and (B) a partial ester of (a) carbonic acid and (b) a monohydroxy alcohol having three to ten carbon atoms and an unsaturated linkage in an aliphatic straight chain.
7. The compound of chain 6 in which the monohydric alcohol is allyl alcohol.
8. The polymer of the compound defined in claim 6.

IRVING E. MUSKAT.
FRANKLIN STRAIN.